Figure 1:
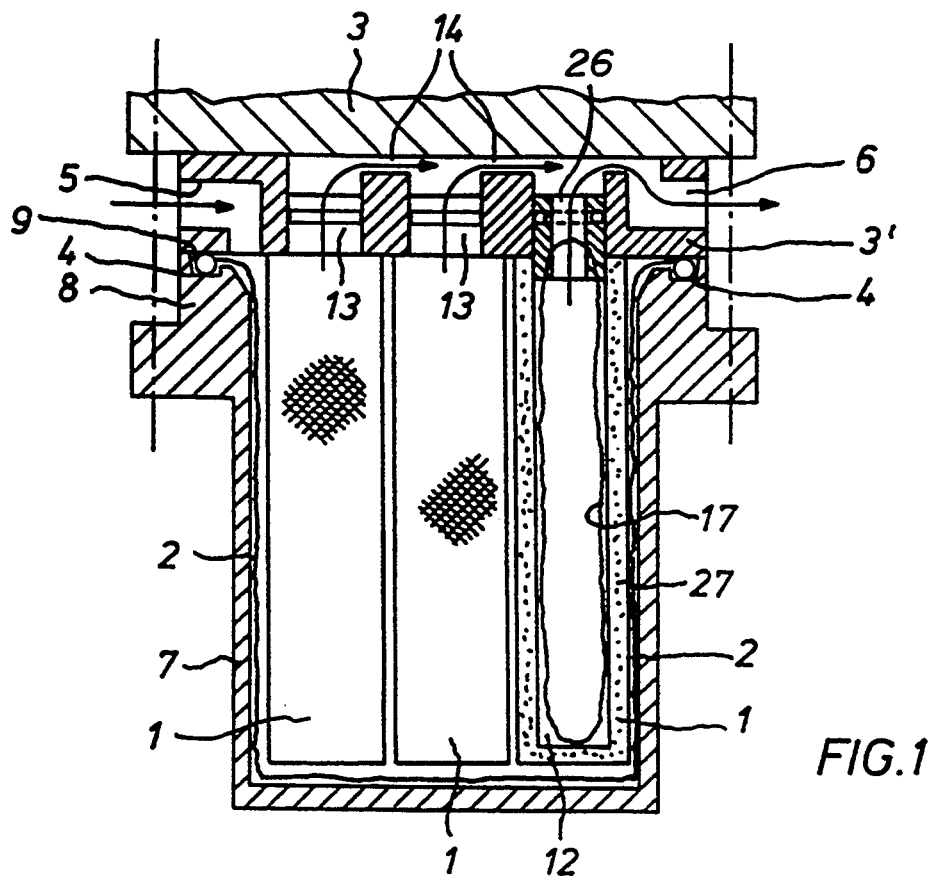

United States Patent [19]

Schwarz et al.

[11] Patent Number: 5,364,528

[45] Date of Patent: Nov. 15, 1994

[54] FILTER APPARATUS INCLUDING FILTER CARTRIDGES AND AN INPERMEABLE FILM BAG

[75] Inventors: Lothar Schwarz, Oberkirch; Guenther Kuntz, Munich, both of Germany

[73] Assignee: BASF Magnetics GmbH, Mannheim, Germany

[21] Appl. No.: 16,278

[22] Filed: Feb. 11, 1993

[30] Foreign Application Priority Data

Feb. 14, 1992 [DE] Germany ............... 4204354

[51] Int. Cl.$^5$ ................................. B01D 29/52
[52] U.S. Cl. ........................... 210/323.2; 210/420; 210/452; 210/453; 210/455
[58] Field of Search ............ 210/435, 453, 455, 483, 210/248, 322, 323.2, 339, 346, 418, 420, 452, 486

[56] References Cited

U.S. PATENT DOCUMENTS

| | | | |
|---|---|---|---|
| 3,684,100 | 8/1972 | Close | 210/444 |
| 4,120,794 | 10/1978 | Taylor | 210/453 |
| 4,690,621 | 9/1987 | Swain | 210/416.1 |
| 4,707,256 | 11/1987 | Gerteis | 210/236 |
| 4,711,717 | 12/1987 | Wolf | 210/137 |
| 4,882,051 | 11/1989 | Itoh | 210/248 |
| 5,017,287 | 5/1991 | Kuntz et al. | 210/433.1 |

FOREIGN PATENT DOCUMENTS 3917517 12/1990 Germany.
1136530 12/1968 United Kingdom.

*Primary Examiner*—Robert A. Dawson
*Assistant Examiner*—W. L. Walker
*Attorney, Agent, or Firm*—Keil & Weinkauf

[57] ABSTRACT

A filter apparatus is described, in which there are in the interior of a filter housing (7) a multiplicity of filter elements (1) which are suspended on the filter cover (3) and in which the inner bores of the filter cartridges are connected to the outlet nozzle (6) via a system of channels. Against the wall of the filter housing (7) there bears a film bag (2), the upper end of which is welded to an O-ring (4), which is seated in an annular groove on the flange of the filter housing, with the diameters of O-ring and film bag being identical. Furthermore, volume displacers (16, 17, 25), which extend in the axial direction over the entire length of the filter housing, are provided between filter bag (2) and inner wall of the filter housing as well as in the inner space of the filter cartridges. When a filter is changed, these volume displacers are, for example, inflated with compressed air, as a result of which the volume of residual filtrate is considerably reduced, so that less loss of dispersion occurs. The arrangement described permits an easy filter change and offers advantages in the disposal of the residues (2).

12 Claims, 2 Drawing Sheets

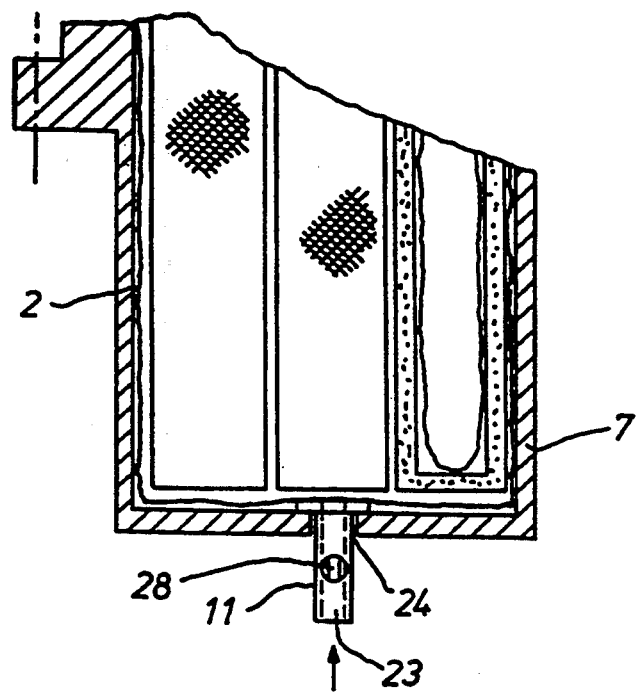
FIG. 3
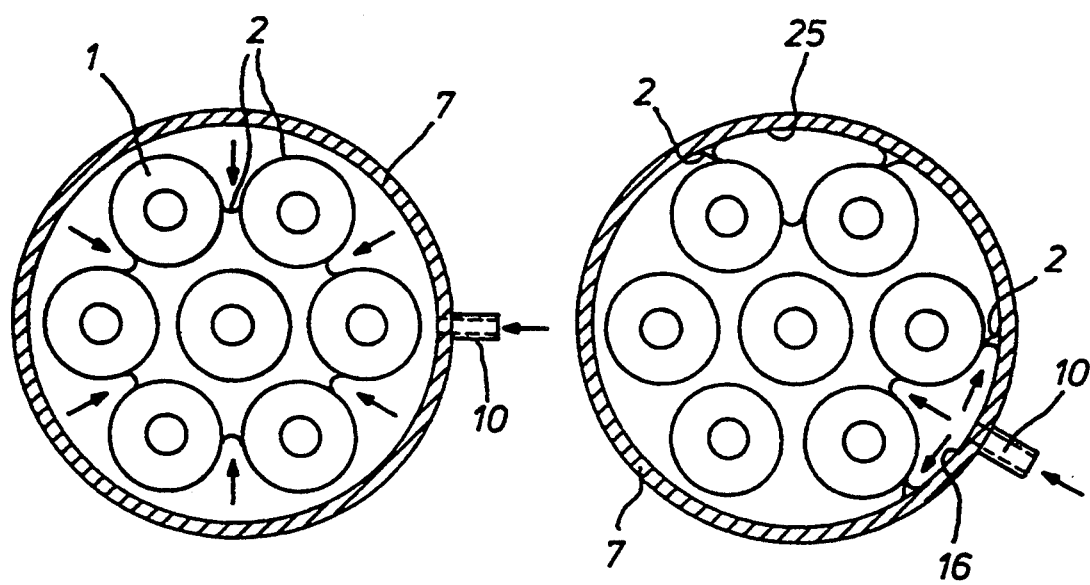
FIG. 4
FIG. 5

FILTER APPARATUS INCLUDING FILTER CARTRIDGES AND AN INPERMEABLE FILM BAG

The invention relates to a filter apparatus for the filtration of liquids or dispersions, having a filter housing, a filter cover, having filter cartridges suspended from the cover, having a media-impermeable film bag, the length and width of which are greater than the dimension of the filter housing and which surrounds the filter cartridges and bears against the filter housing, having a feed opening arranged between cover and filter housing, which opening communicates with the interior of the film bag, and having discharge nozzles extending upward from the interior of the filter cartridge, which nozzles cross the filter cover and open out into a common discharge nozzle in the filter cover.

Filter apparatuses of the generic type mentioned at the beginning are known from the prior art. For instance, in U.S. Pat. No. 3,684,100 a filter device is described in which there is located in the interior of the filter housing a flexible sleeve which can be disposed together with the filter cartridge and is supported on the inside of the filter element, so that the filter element can be quickly exchanged without contaminating the surroundings. In U.S. Pat. No. 4,711,717, a filter apparatus is described which has a media-impermeable hose which is firmly connected by its one end region to the one end of the filter cartridge by means of a disc-shaped adaptor and the second end region of the hose being closed, at least during the operation of the filter apparatus. In U.S. Pat. No. 4,882,051, a filter apparatus, in particular for magnetic dispersions, is described, in which a likewise media-impermeable film bag is situated in a filter housing, the liquid to be filtered flowing in under pressure through its upper opening and being forced through a filter cartridge situated centrally in the film bag and leaving the filter apparatus downward, the lower end of the film bag being firmly connected to the filter cartridge. DE 39 09 382 and 39 17 517 disclose individual filter elements for magnetic dispersions which cause only a minimal loss of filtrate when the filter insert is changed. In the first-mentioned application this is brought about by there being located in an upwardly open annular gap between an outer supporting body and an inner supporting body a filter insert comprising an annular bottom part and cover part having inlet and outlet openings and, if appropriate, flexible walls and filter material between the walls, through which material the dispersion to be filtered is forced radially from the one hollow space into the other hollow space. In the last-mentioned application, a filter cartridge is described which is likewise flowed through radially from outside to inside by the dispersion to be filtered and there being contained in the inner space of the filter cartridge a compressible flexible volume displacer, which is compressed upon pressurization and thus allows the filtrate through and assumes its original shape again when the filter is changed, so that only a minimal volume is lost.

If filter elements and filter housings in which large volumes of liquids or dispersions are forced through are used, increased amounts of lost filtrate must be expected when changing the filter cartridges on account of the design and combination of a plurality of filter elements to form a complete filter of larger filter area. If toxic, environmentally hazardous and expensive raw materials are used, this leads to difficulties in the disposal of the used filter elements or to high filtrate costs. This applies in particular to the filtration of magnetic dispersions in which polymeric binders, inorganic pigments and additives are dispersed in an organic solvent. Such dispersions are filtered under differential pressures of 2 to 10 bar through filters having pore widths of 1 to 50 µm.

It is an object of the present invention to provide a filter apparatus of the generic type mentioned at the beginning which has an exchangeable filter insert and
  causes only a minimal loss of filtrate when the filter insert is changed and in which the number of parts to be cleaned is reduced
  is designed in such a way that the filter insert withstands the operating pressure
  when a filter is changed, any contact of the operating personnel with the liquid to be filtered is reduced to a minimum.

We have found that this object is achieved by a filter apparatus for the filtration of liquids or dispersions, having a filter housing, a filter cover, having filter cartridges suspended from the cover, having a media-impermeable film bag, the length and width of which are greater than the corresponding dimension of the filter housing and which surrounds the filter cartridges and bears at least indirectly against the filter housing, having a feed nozzle provided on the cover or in the filter housing for the liquid, which communicates with the interior of the film bag and having a discharge nozzle extending outward from the interior of the filter cartridges, wherein the upper open end of the film bag is connected to an O-ring, which is seated on an annular recess of the upper flange of the filter housing, which is firmly connected to the cover by screwing, the diameter of the O-ring being equal to the diameter of the film bag, compressible volume displacers being arranged in the inner space of the filter cartridges or compressible or externally compressed-air-inflatable volume displacers being arranged between inner wall of the filter housing and the film bag or compressed air being blown into the space between film bag and inner wall of the filter housing through an opening. Further details of the invention emerge from the subclass, the description and the drawings.

Figure 2:
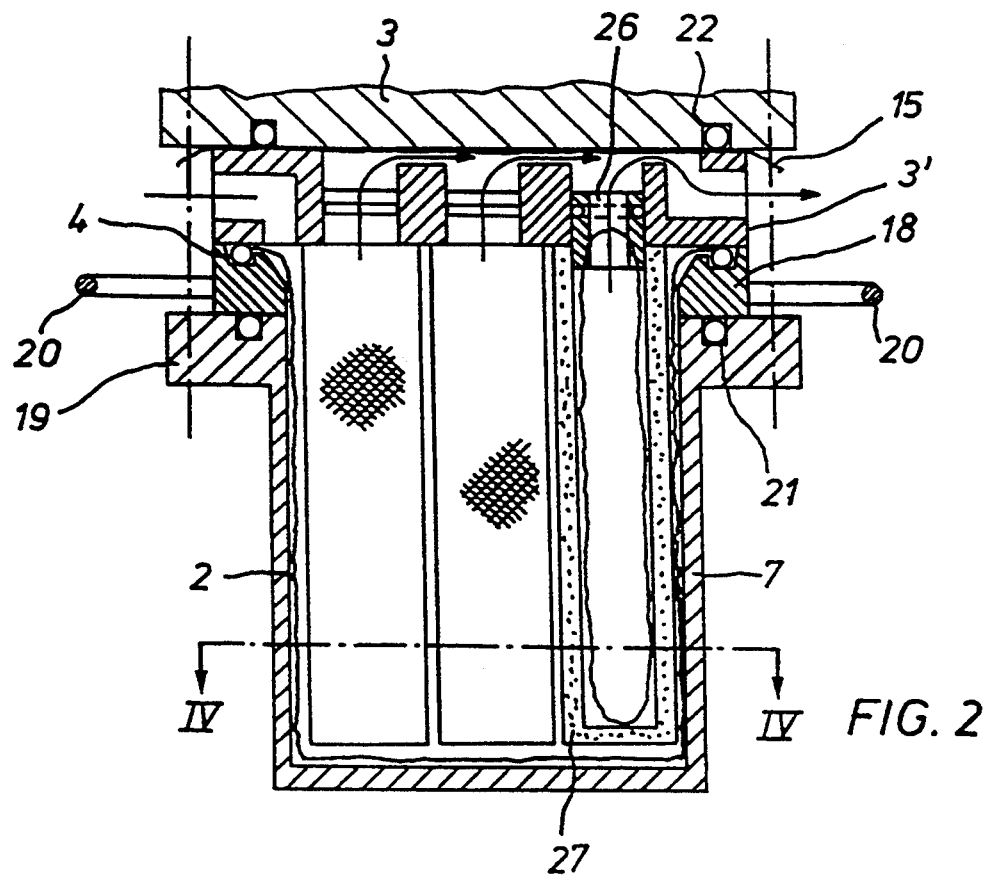

The invention is explained in more detail below with reference to the drawings, in which:

FIGS. 1-3 show longitudinal sections through filter elements according to the invention FIGS. 4-5 show cross sections through a filter element according to FIG. 2 along the line IV FIG. 1 shows a design of the filter apparatus according to the invention. The filter element comprises a cup-shaped hollow-cylindrical outer housing (7) having an upper annular flange (8). Seated on the latter is the cover (3), which is connected to the flange by screwing and the lower part (3') of which is provided with various openings, which are explained in more detail below. A lateral opening (5) is intended for the entry of the dispersion into the filter vessel, into which there enter a multiplicity of filter cartridges (1), which are inserted and fastened (26) on the lower part of the cover (3'). The dispersion to be filtered flows through the filter cartridges in the radial direction through the filter cloth (27) from outside to inside and the filtered dispersion flows off through the inner space (12), which is connected to the openings (13) in the filter cover, via channels (14) and the delivery nozzle (6). Possible arrangements of the filter cartridges in the filter element are evident from the cross sectional drawings FIG. 4 and FIG. 5.

Against the inner wall of the filter housing (7) there bears a flexible film bag (2), the upper end of which is open and the open end of which is connected to a flexible O-ring (4), the O-ring being seated in an annular recess (9) of the flange (8). The length and width of the film bag are greater than the corresponding dimension of the filter housing. In this way, an adequate seal is accomplished between the cover (3, 3') and the filter vessel (7). What is essential for the invention is that the diameter of the O-ring (4) is equal to the diameter of the film bag (2). It is namely in this way that the open end of the film bag is connected free from folds to the O-ring and thus provides an outstanding seal.

When a filter change is necessary, the cover is removed by unscrewing from the filter housing (7) and the film bag (2) is removed and disposed of together with the filter cartridges and the residual dispersion located in the inner space of the filter. Thereupon, the filter elements (1) can be taken off the lower part of the cover (3'), and only the cover (3, 3') need be cleaned, since the inner space of the filter housing did not come into contact with the dispersion during the filtering time. Thereupon, a new filter bag can be inserted, then new filter cartridges can be fitted together with the cover, whereupon a further filtering cycle begins.

A second, particularly advantageous embodiment of the filtering apparatus according to the invention is represented in FIG. 2. In the case of this design, the O-ring (4) holding the film bag (2) is not seated in the filter housing itself but in the recess of a separate annular part (18), which has two lateral grips (20). This ring (18) is additionally sealed from the flange (19), forming the upper end of the filter housing (7), by means of an O-ring (21) seated in an annular recess of the flange. On the ring (18) there rests an intermediate cover (3'), the construction of which corresponds to the lower part of the cover described in more detail with reference to FIG. 1.

On the intermediate cover (3') there is the end cover (3) as a separate part, which is firmly connected by a screw connection to the filter housing (7) or the flange (19) of the latter. Inserted between the intermediate cover (3') and the cover (3) is a film (15), the seal being brought about by an O-ring (22), which is seated in an annular recess provided in the lower part of the cover (3) and presses the film (15) against the intermediate cover (3').

When a filter change is necessary in this filter apparatus, the screw connections (not shown) between cover and filter housing are loosened, the cover (3) is taken off, whereupon the complete filter insert with intermediate cover (3') can be lifted out with the aid of the grips (20) and removed for cleaning or disposal of the filter bag and the filter cartridges. In the case of this embodiment in particular, any contact of the operating personnel with the dispersion is avoided; in addition, the escape of aggressive solvents is reduced to a minimum. Finally, in the case of this embodiment the number of parts to be cleaned is reduced to the intermediate cover (3') since all other parts have not come into contact with the dispersion. It is also evident from the description that in the case of this embodiment a rapid and simple filter change is possible.

A further embodiment is evident from FIG. 3. As far as the inserting and sealing of the upper end of the film bag (2) are concerned, this embodiment corresponds to the designs of FIGS. 1 and 2. However, in the case of this embodiment the dispersion does not enter the filter housing (7) laterally through the cover or intermediate cover (3, 3') but rather through an opening (23) which is located centrally on the lower end of the film bag (2). A pipe piece (11) is connected to the film bag (2) by welding. The pipe piece (11) of the film bag is fitted in a corresponding clearance (24) in the lower part of the filter housing and is provided with a shut-off cock (28). After flowing through the filter cartridges as described above, the cleaned dispersion leaves through the channels and cross-sections in the intermediate cover, as in the other embodiments.

In the following it is explained how, when changing the filter apparatus described, the object is achieved of causing only a minimal loss of filtrate. Further details are revealed by FIGS. 1, 4 and 5.

In FIG. 1 it is shown that there is a compressible body (17) in the inner space (12) of the filter cartridges (1). If the operating pressure is removed when changing the filtering apparatus, the compression body can expand and displaces the dispersion still remaining in the filter cartridges to a minimum. A further reduction in the loss of filtrate is brought about by air being blown in through a lateral opening (10) in the filter housing (7), so that, as shown in FIG. 4, the filter bag (2) is urged away from the wall of the filter housing (7) and is pressed partially into the free space between the filter cartridges (1) and in this way the residual volume is reduced considerably.

In FIG. 5, an alternative embodiment for reducing the volume of residual filtrate is represented. In this case, air-inflatable volume displacers (16) are evenly distributed in the inner space of the filter housing between inner wall of the filter housing and film bag. Similarly, compressible volume displacers (25) may also be arranged at this point, as likewise revealed by this figure.

The filter housing, the rings, intermediate rings and the cover preferably consist of stainless steel, the intermediate cover (3') may likewise consist of hard plastic.

The filter cartridges contain as filter material (27) a folded, coiled or sintered medium known from the prior art, for example polypropylene, polyethylene terephthalate, polyamide, cotton, glassfibre or steel. The film bag (2) and the film (15) consist of synthetic plastics material, for example of polyethylene or polypropylene.

The objects presented at the beginning are achieved completely by the embodiments mentioned above, so that cleaning costs and regenerating costs are saved and the losses when changing the filter are substantially reduced.

We claim:

1. A filter apparatus for the filtration of liquids or dispersions, having a filter housing with a flange at its upper end, a filter cover, having filter cartridges suspended from the cover, having a media-impermeable film bag which is open at its upper end, the length and width of which are greater than the corresponding dimension of the filter housing and which surrounds the filter cartridges and bears at least indirectly against the filter housing, having a feed nozzle for the liquid, which communicates with the interior of the film bag and having a discharge nozzle extending outward from the interior of the filter cartridges, wherein the upper open end of the film bag is connected to an O-ring, which is seated on an annular recess of the upper flange of the filter housing, which is firmly connected to the cover by screwing, the diameter of the O-ring being equal to the diameter of the film bag, and compressible volume displacers being arranged in the inner space of the filter cartridges.

2. A filter apparatus as claimed in claim 1, wherein an intermediate cover, provided with openings, is located between the cover and the filter housing for feeding and discharging the dispersion and wherein the upper open end of the film bag is inserted in a ring which can be removed from the filter housing and on which the intermediate cover rests in a sealable manner.

3. A filter apparatus as claimed in claim 1, wherein an intermediate cover, provided with openings, is located between the cover and the filter housing for feeding and discharging the dispersion and wherein a plastic film is inserted between the intermediate cover and the cover, which film can be pressed against the intermediate cover and sealed by an O-ring fitted in an annular recess of the underside of the filter cover.

4. A filter apparatus as claimed in claim 1, wherein a pipe piece is welded onto the lower end of the film bag, which piece is provided with a drain cock and is led through a lower opening of the filter housing.

5. A filter apparatus for the filtration of liquids or dispersions, having a filter housing with a flange at its upper end, a filter cover, having filter cartridges suspended from the cover, having a media-impermeable film bag which is open at its upper end, the length and width of which are greater than the corresponding dimension of the filter housing and which surrounds the filter cartridges and bears at least indirectly against the filter housing, having a feed nozzle for the liquid, which communicates with the interior of the film bag and having a discharge nozzle extending outward from the interior of the filter cartridges, wherein the upper open end of the film bag is connected to an O-ring, which is seated on an annular recess of the upper flange of the filter housing, which is firmly connected to the cover by screwing, the diameter of the O-ring being equal to the diameter of the film bag, and compressible or externally compressed-air-inflatable volume displacers being arranged between inner wall of the filter housing and the film bag.

6. A filter apparatus as claimed in claim 5, wherein an intermediate cover, provided with openings, is located between the cover and the filter housing for feeding and discharging the dispersion and wherein the upper open end of the film bag is inserted in a ring which can be removed from the filter housing and on which the intermediate cover rests in a sealable manner.

7. A filter apparatus as claimed in claim 5, wherein an intermediate cover, provided with openings, is located between the cover and the filter housing for feeding and discharging the dispersion and wherein a plastic film is inserted between the intermediate cover and the cover, which film can be pressed against the intermediate cover and sealed by an O-ring fitted in an annular recess of the underside of the filter cover.

8. A filter apparatus as claimed in claim 5, wherein a pipe piece is welded onto the lower end of the film bag, which piece is provided with a drain cock and is led through a lower opening of the filter housing.

9. A filter apparatus for the filtration of liquids or dispersions, having a filter housing with a flange at its upper end, a filter cover, having filter cartridges suspended from the cover, having a media-impermeable film bag which is open at its upper end, the length and width of which are greater than the corresponding dimension of the filter housing and which surrounds the filter cartridges and bears at least indirectly against the filter housing, having a feed nozzle for the liquid, which communicates with the interior of the film bag and having a discharge nozzle extending outward from the interior of the filter cartridges, wherein the upper open end of the film bag is connected to an O-ring, which is seated on an annular recess of the upper flange of the filter housing, which is firmly connected to the cover by screwing, the diameter of the O-ring being equal to the diameter of the film bag, and compressed air being blown into the space between the film bag and inner wall of the filter housing through an opening.

10. A filter apparatus as claimed in claim 9, wherein an intermediate cover, provided with openings, is located between the cover and the filter housing for feeding and discharging the dispersion and wherein the upper open end of the film bag is inserted in a ring which can be removed from the filter housing and on which the intermediate cover rests in a sealable manner.

11. A filter apparatus as claimed in claim 9, wherein an intermediate cover, provided with openings, is located between the cover and the filter housing for feeding and discharging the dispersion and wherein the upper open end of the film bag is inserted in a ring which can be removed from the filter housing and on which the intermediate cover rests in a sealable manner.

12. A filter apparatus as claimed in claim 9, wherein a pipe piece is welded onto the lower end of the film bag, which piece is provided with a drain cock and is led through a lower opening of the filter housing.

* * * * *